(12) United States Patent
Hassan

(10) Patent No.: US 9,730,133 B2
(45) Date of Patent: Aug. 8, 2017

(54) SYNTHETIC TRANSACTION FOR WIRELESS HANDOVER

(71) Applicant: Microsoft Technology Licensing, LLC, Redmond, WA (US)

(72) Inventor: Amer Aref Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 14/713,761

(22) Filed: May 15, 2015

(65) Prior Publication Data

US 2016/0337927 A1 Nov. 17, 2016

(51) Int. Cl.
*H04W 36/30* (2009.01)
*H04W 36/16* (2009.01)
*H04W 36/00* (2009.01)
*H04W 36/14* (2009.01)
*H04W 84/02* (2009.01)

(52) U.S. Cl.
CPC ....... *H04W 36/30* (2013.01); *H04W 36/0016* (2013.01); *H04W 36/165* (2013.01); *H04W 36/14* (2013.01); *H04W 84/02* (2013.01)

(58) Field of Classification Search
None
See application file for complete search history.

(56) References Cited

U.S. PATENT DOCUMENTS

| | | |
|---|---|---|
| 7,092,405 B2 | 8/2006 | Guo et al. |
| 8,923,818 B2 | 12/2014 | Palamara et al. |
| 8,929,331 B2 | 1/2015 | Karaoguz et al. |
| 2005/0147049 A1* | 7/2005 | Ganesan ............ H04M 1/2535 370/241 |
| 2007/0026854 A1 | 2/2007 | Nath et al. |
| 2009/0215444 A1* | 8/2009 | Topaltzas ............. H04W 24/06 455/425 |
| 2009/0285175 A1 | 11/2009 | Nix |
| 2011/0237238 A1 | 9/2011 | Hassan et al. |
| 2013/0077482 A1 | 3/2013 | Krishna et al. |
| 2013/0210415 A1 | 8/2013 | Mathias et al. |
| 2013/0272260 A1 | 10/2013 | Bitran et al. |
| 2014/0079022 A1 | 3/2014 | Wang et al. |
| 2014/0192643 A1 | 7/2014 | Kalapatapu et al. |

(Continued)

FOREIGN PATENT DOCUMENTS

| WO | 2013104951 A1 | 7/2013 |
|---|---|---|
| WO | WO-2014116757 | 7/2014 |
| WO | 2016014323 A1 | 1/2016 |

OTHER PUBLICATIONS

"A 3G/LTE Wi-Fi Offload Framework: Connectivity Engine (CnE) to Manage Inter-System Radio Connections and Applications", Available at: <https://www.google.co.in/url?sa=t&rct=j&q=&esrc=s&source=web&cd=1&cad=rja&uact=8&ved=0CBOQFjAA&url=https%3A%2F%2Fwww.qualcomm.com%2Fmedia%2Fdocuments%2Ffiles%2F3g-lte-wifi-offload-framework.pdf&ei=pnTIVL2sJ8aTuATa2ILYCw&usg=AFQjCNFSmfNcKgJUi, Jun. 2011, 15 pages.

(Continued)

*Primary Examiner* — Anh Ngoc Nguyen

(57) ABSTRACT

Techniques for synthetic transaction for wireless handover are described. According to various embodiments, a synthetic transaction is utilized to determine a signal quality of a wireless network. Based on the signal quality, a decision is made whether to perform a handover of a communication session to a wireless network.

20 Claims, 9 Drawing Sheets

(56) References Cited

U.S. PATENT DOCUMENTS

| | | |
|---|---|---|
| 2014/0199994 A1 | 7/2014 | Richards |
| 2015/0237552 A1* | 8/2015 | White .................. H04W 36/14 370/331 |
| 2015/0257066 A1* | 9/2015 | Salkintzis ............ H04W 12/06 455/442 |

OTHER PUBLICATIONS

"Voice and Video Calling over LTE", In Proceedings: Ericsson White Paper Available at: <http://www.ericsson.com/res/docs/whitepapers/wp-voice-and-video-calling-over-lte.pdf>, Nov. 2014, 18 pages.

Khan,"An Optimized Network Selection and Handover Triggering Scheme for Heterogeneous Self-Organized Wireless Networks", In Proceedings: Mathematical Problems in Engineering, vol. 2014, Jun. 16, 2014, 12 pages.

Noble, et al., "Trace-Based Mobile Network Emulation", In ACM SIGCOMM Computer Communication Review, vol. 27, Issue 4, Sep. 14, 1997, 12 Pages.

"International Search Report & Written Opinion Issued in PCT Application No. PCT/US2016/031949", Mailed Date: Jun. 28, 2016, 16 Pages.

"Second Written Opinion", Application No. PCT/US2016/031949, Apr. 3, 2017, 10 pages.

\* cited by examiner

SYNTHETIC TRANSACTION FOR WIRELESS HANDOVER

BACKGROUND

Modern communication systems have an array of capabilities, including integration of various communication modalities with different services. For example, voice/video communications, instant messaging, data/application sharing, white-boarding, and other forms of communication may be combined with presence and availability information for users. Such systems enable users to engage in communication sessions to exchange different types of communication media, such as voice data, video data, content sharing, and combinations thereof. Furthermore, collaboration systems that enable users to share and collaborate in creating and modifying various types of documents and content may be integrated with multimodal communication systems providing different kinds of communication and collaboration capabilities. Such integrated systems are sometimes referred to as Unified Communication (UC) systems.

While UC systems provide for increased flexibility in communications, they also present a number of implementation challenges. For instance, a UC system typically utilizes multiple interconnected networks to route various communications. Since different networks may be managed by different entities, challenges thus arise in maintaining communications quality for communications that are routed among independently managed networks. Further, UC is typically implemented via software that can be loaded on mobile devices, e.g., tablets, smartphones, laptops, and so forth. Thus, techniques for managing UC&C communication traffic typically have to be fluid and dynamic to accommodate changing connection scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for synthetic transaction for wireless handover are described. According to various embodiments, a synthetic transaction is utilized to determine a signal quality of a wireless network. Based on the signal quality, a decision is made whether to perform a handover of a communication session to a wireless network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
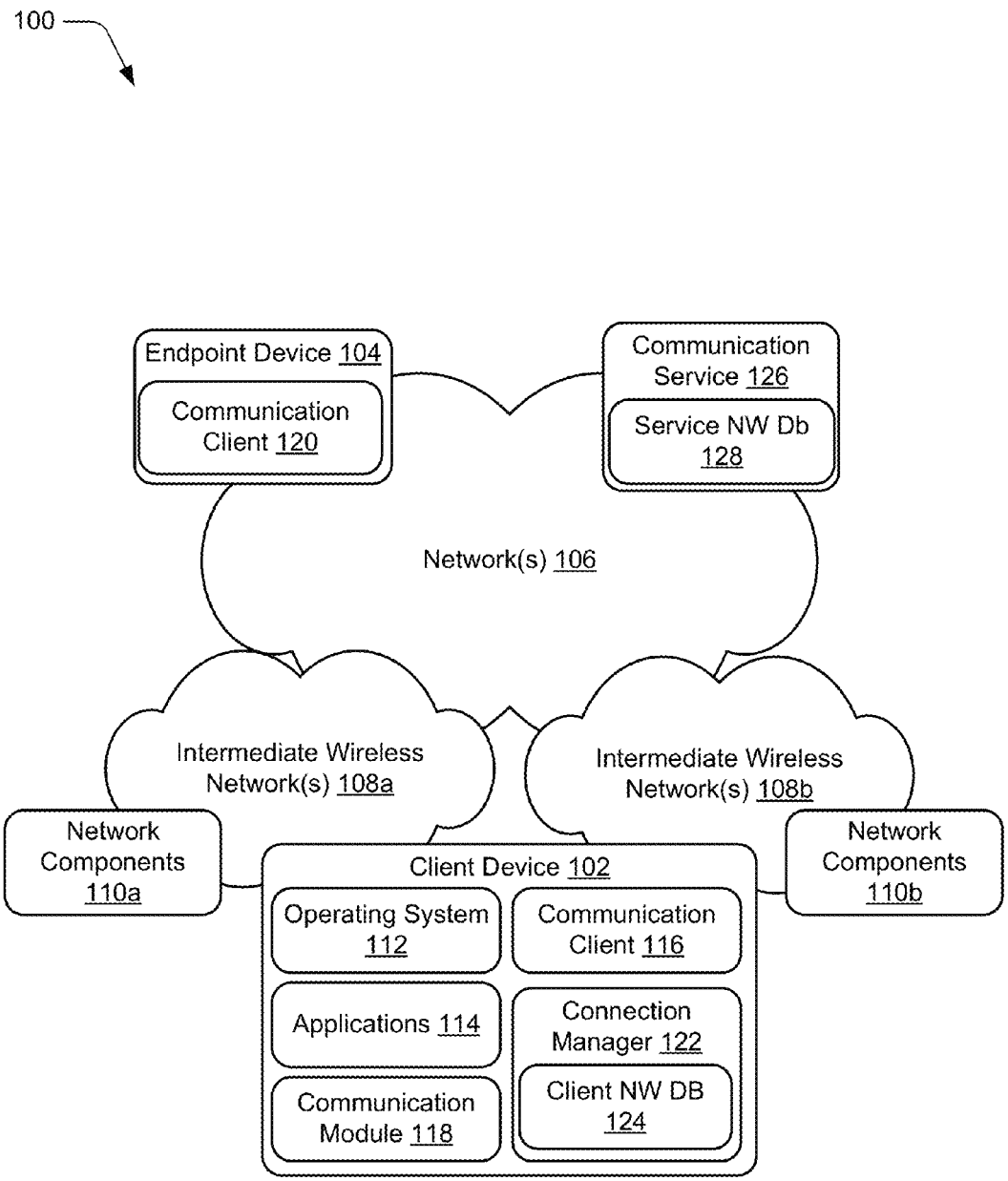
FIG. 1 is an illustration of an environment in an example implementation that is operable to employ techniques discussed herein.

Techniques for synthetic transaction for wireless handover are described. According to various implementations, a synthetic transaction represents an automated transmission of communication media across one or more wireless networks. For instance, a synthetic transaction is a simulation of a communication session between different communication endpoints. Generally, synthetic transactions are utilized to determine signal quality across wireless networks.

In an example implementation, a client device is participating in a communication session with one or more other devices via a data connection to a first wireless network. Generally, a communication session refers to an exchange of communication media between communication endpoints, such as part of a real-time communication session between users of different communication endpoints. Examples of a communication session include a Voice over Internet Protocol (VoIP) call, a video call, text messaging, a file transfer, and/or combinations thereof. In at least some implementations, a communication session represents a Unified Communications (UC) session.

While the communication session is in progress over the first wireless network, the client device detects that a second wireless network is available. For instance, the first wireless network is a wireless cellular network (e.g., a Long Term Evolution (LTE) network) and the second wireless network is a wireless local area network, such as a WiFi™ network. Consider, for example, that the client device is a mobile device, and a user carrying the client device while participating in the communication session arrives at a location where the second wireless network provides wireless coverage.

Accordingly, the client device ascertains that the second wireless network is available for a wireless handover of the communication session from the first wireless network. For instance, the first wireless network may be a metered network that charges for the data connection based on usage, e.g., for minutes of usage. Further, the second wireless network may provide a cheaper (e.g., free) wireless data connection. Thus, performing a handover to the second wireless network may reduce or eliminate a cost to the user of the client device for participating in the communication session.

Prior to initiating a handover to the second wireless network, however, a synthetic transaction over the second wireless network is performed to determine a signal quality across the second wireless network. Generally, a synthetic transaction involves a transmission of communication media, simulated communication media, and/or other type of data across the second wireless network. The synthetic transaction is independent of the communication session and is performed while the communication session is in progress across the first wireless network, e.g., concurrently with the communication session. In at least some implementations, the synthetic transaction simulates conditions of an actual communication session without requiring the user of the client device to expressly initiate the synthetic transaction or to input communication media for the synthetic transaction.

A signal quality for the synthetic transaction is then determined and is used to infer a general signal quality across the second wireless network. For instance, the client device receives signal quality feedback from one or more entities involved in the synthetic transaction, such as a network component of the second wireless network, an endpoint involved in the communication session, a communication service, and so forth. The signal quality is compared with a signal quality threshold to determine whether the second wireless network provides sufficient signal quality for receiving a handover from the first wireless network. If the signal quality complies with the signal quality threshold, a handover process is initiated to handover the communication session from the first wireless network to the second wireless network. However, if the signal quality does not comply with the signal quality threshold, the communication session is maintained over the first wireless network. In one or more implementations, a user may be given an option to override a decision not to perform a handover to the second wireless network.

Thus, implementations discussed herein can prevent a handover to a wireless network that is not capable of providing sufficient signal quality for a communication session. This prevents a degradation in signal quality for a communication session that may result in a handover to a lesser quality wireless network, and thus assists in maintaining a high quality user experience for the communication session.

According to one or more implementations, when a particular wireless network is detected that is available for a handover of a communication session, the wireless network is compared to a list of known trusted wireless networks to determine if the particular wireless network is a known trusted wireless network. If the particular wireless network is determined to be a known trusted wireless network, a handover of the communication session is initiated without performing a synthetic transaction to determine a signal quality of the particular wireless network. If the particular wireless network is not determined to be a known trusted wireless network, however, a synthetic transaction is performed to determine a signal quality of the particular wireless network before deciding whether to perform a handover to the particular wireless network.

In the following discussion, an example environment is first described that is operable to employ techniques described herein. Next, a section entitled "Synthetic Transaction Parameters and Observations" discusses some example ways for communicating parameters for and observations of synthetic transactions. Following this, a section entitled "Example Implementation Scenarios" describes some example implementation scenarios in accordance with one or more embodiments. Next, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques synthetic transaction for wireless handover described herein. Generally, the environment 100 includes various devices, services, and networks that enable communication via a variety of different modalities. For instance, the environment 100 includes a client device 102 and an endpoint device 104 connected to a network 106. The client device 102 and the endpoint device 104 may be configured in a variety of ways, such as a traditional computer (e.g., a desktop personal computer, laptop computer, and so on), a mobile station, an entertainment appliance, a smartphone, a wearable device, a netbook, a game console, a handheld device (e.g., a tablet), and so forth.

The network 106 is representative of a network that provides the client device 102 with connectivity to various networks and/or services, such as the Internet. The network 106 may provide the client device 102 with connectivity via a variety of different connectivity technologies, such as broadband cable, digital subscriber line (DSL), wireless cellular, wireless data connectivity (e.g., WiFi™), T-carrier (e.g., T1), Ethernet, and so forth. In at least some implementations, the network 106 represents different interconnected wired and wireless networks.

The network 106 includes an intermediate wireless network 108a and an intermediate wireless network 108b. Generally, the wireless networks 108a, 108b are configured to provide wireless connectivity to the network 106. The wireless networks 108a, 108b may be implemented via a variety of different wireless technologies, such as wireless cellular, wireless broadband connectivity (e.g., WiFi™), Bluetooth, and so forth. According to various implementations discussed herein, the wireless network 108a represents a different wireless technology than the wireless network 108b. For instance, the wireless network 108a represents a wireless cellular network (e.g., a Long Term Evolution (LTE) network), and the wireless network 108b represents a WiFi™ network. This is not to be construed as limiting on the claimed implementations, however, and the wireless networks 108a, 108b may be implemented using any suitable wireless technologies.

The wireless networks 108a, 108b include respective network components 110a, 110b. Generally, the network components 110a, 110b are representative of hardware and logic for implementing and managing the respective wireless networks 108a, 108b. Examples of the network components 110a, 110b include wireless access points (APs), wireless base stations, gateways, routers, switches, and so forth.

The client device 102 includes a variety of different functionalities that enable various activities and tasks to be performed. For instance, the client device 102 includes an operating system 112, applications 114, a communication client 116, and a communication module 118. Generally, the operating system 112 is representative of functionality for abstracting various system components of the client device 102, such as hardware, kernel-level modules and services, and so forth. The operating system 112, for instance, can abstract various components of the client device 102 to the applications 114 to enable interaction between the components and the applications 114.

The applications 114 represent functionalities for performing different tasks via the client device 102. Examples of the applications 114 include a word processing application, a spreadsheet application, a web browser, a gaming application, and so forth. The applications 114 may be installed locally on the client device 102 to be executed via a local runtime environment, and/or may represent portals to remote functionality, such as cloud-based services, web apps, and so forth. Thus, the applications 114 may take a variety of forms, such as locally-executed code, portals to remotely hosted services, and so forth.

The communication client 116 is representative of functionality to enable different forms of communication via the client device 102, such as for communication between the client device 102 and the endpoint device 104. Examples of the communication client 116 include a voice communication application (e.g., a VoIP client), a UC client, a video communication application, a messaging application, a content sharing application, and combinations thereof. The communication client 116, for instance, enables different communication modalities to be combined to provide diverse communication scenarios. In at least some implementations, the communication client 116 represents an application that is installed on the client device 102. Additionally or alternatively, the communication client 116 can be implemented as a portal to a remote application, such as accessed via a web browser, a web application, and so forth.

According to one or more implementations, communication between the client device 102 and the endpoint device 104 occurs between the communication client 116 and a communication client 120 of the endpoint device 104. The communication client 120, for instance, represents an instance of the communication client 116. For example, a communication session between the client device 102 and the endpoint device 104 represents an exchange of communication media between the communication client 116 and the communication client 120.

The communication module 118 of the client device 102 is representative of functionality for enabling the client device 102 to communicate data over wired and/or wireless connections. For instance, the communication module 118 represents hardware and logic for data communication over the network 106 via a variety of different wired and/or wireless technologies and protocols.

The client device 102 further includes a connection manager 122, which is representative of functionality to perform various network connectivity tasks for the client device 102. For instance, the connection manager 122 enables the client device 102 to connect to one or more of the wireless networks 108a, 108b. In at least some implementations, the connection manager 122 is representative of functionality for performing various aspects of techniques for synthetic transaction for wireless handover discussed herein.

The connection manager 122 maintains a client network database (DB) 124, which is representative of functionality for storing attributes of different networks. Examples of network attributes that may be stored by the client network DB 124 include quality indicators for different networks (e.g., historic signal quality for communication sessions over different networks), network types, network technologies, and so forth. In at least some implementations, the client network DB 124 indicates whether a particular network is a preferred network, e.g., is preferred over other networks for providing wireless connectivity to the client device 102.

The environment 100 further includes a communication service 126, which is representative of a service to perform various tasks for management of communication between the client device 102 and the endpoint device 104. The communication service 126, for instance, can manage initiation, moderation, and termination of communication sessions. Examples of the communication service 126 include a VoIP service, an online conferencing service, a UC service, and so forth. In at least some implementations, the communication service 126 may be implemented as or be connected to a private branch exchange (PBX) in communication with a Public Switched Telephone Network ("PSTN") to enable voice communication between the client device 102 and the endpoint device 104.

According to one or more implementations, the communication clients 116, 120 are managed and/or hosted by the communication service 126. For instance, the communication clients 116, 120 represent interfaces to communication services provided by the communication service 126.

The communication service 126 maintains a service network database (DB) 128, which is representative of functionality for storing attributes of different networks. Examples of network attributes that may be stored by the service network DB 128 include quality indicators for different networks (e.g., historic signal quality for communication sessions over different networks), network types, network technologies, and so forth. The service network DB 128, for instance, indicates whether a particular network is a trusted network, e.g., is a network that known to provide an acceptable quality of wireless connectivity to the client device 102. In at least some implementations, network attributes from the service network DB 128 are propagated to the client network DB 124.

According to various implementations, the connection manager 122 implements synthetic communication transactions ("synthetic transactions") that simulate various communication scenarios between the client device 102 and other communication endpoints, such as the endpoint device 104. For instance, the connection manager 122 interfaces with the communication service 126 to enable different synthetic transactions to be implemented. As further detailed below, attributes of a synthetic transaction can be utilized to determine whether to perform a connectivity handover between different networks, such as between the wireless networks 108a, 108b.

The various entities and functionalities discussed in the environment 100 may be implemented in software, hardware, firmware, and/or combinations thereof. Further details and implementations of the various entities of the environment 100 are discussed below.

Having described an example environment in which the techniques described herein may operate, consider now a discussion of example ways of propagating various attributes of communication sessions in communication systems in accordance with one or more embodiments.

Synthetic Transaction Parameters and Observations

According to various implementations, techniques can be employed to generate synthetic transactions with a wide variety of different parameters. Consider, for instance, the following parameters that may utilized to generate a synthetic transaction:

(1) Media Type: This parameter can be used to specify a media type and/or types that are to be transmitted and/or simulated as part of a synthetic transaction. Examples of media type include voice data (e.g., audio), video, content, and combinations thereof.

(2) Initiator Address(es): This parameter can be used to specify addresses for endpoints that are to initiate a synthetic transaction. Examples of addresses include media access control (MAC) addresses, Internet protocol (IP) addresses, usernames, phone numbers, and so forth.

(3) Recipient Address(es): This parameter can be used to specify addresses for endpoints that are to "called" as part of a synthetic transaction. In at least some implementations, multiple recipient addresses can be indicated, such as for conference calls, multicast communication events, and so forth.

(4) Codecs: This parameter can be used to specify a codec/codecs to be used to implement a synthetic transaction.

(5) Communication Client Settings: This parameter can be used to specify various communication client settings to be applied and/or simulated as part of a synthetic transaction.

(6) Quality of Service: This parameter can be used to specify quality of service (QoS) to be applied to communication media as part of a synthetic transaction. The attribute, for instance, can specify QoS markings to be applied to communication media. Examples of QoS markings include best effort (BE), expedited forwarding (EF), assured forwarding (AF), and so forth.

(7) Transaction Routing: This parameter can be used to specify specific routes to be used as part of a synthetic transaction. A route, for instance, can be specified in terms of specific instances of network components, such as specific gateways, servers (e.g., UC servers), UC networks, and so forth.

(8) Transaction Type: This parameter can be used to specify different transaction types, such as calls between two devices, conference calls, call multi-forking, multi-cast calls, and so forth.

(9) Transaction Behaviors: This parameter can be used to specify different behaviors that may occur during and/or as part of a transaction, such as user-initiated behaviors, communication service behaviors, device behaviors, and so forth. Examples of transaction behaviors include selection of different communication options, such as placing a call on hold, adjustment of call volume, selecting a call recording option, transferring a call to a different user and/or device, and so forth.

(10) Transaction Timing: This parameter can be used to specify various temporal parameters of a synthetic transaction, such as a date and/or time when a synthetic transaction is to be initiated, a time duration for a synthetic transaction, timing for particular events that occur during a synthetic transaction, and so forth.

These transaction parameters are presented for purpose of example only, and it is to be appreciated that a wide variety of different parameters not expressly mentioned herein may additionally or alternatively be employed in accordance with the claimed implementations.

In at least some embodiments, notification events can be generated that identify attributes that are observed as part of synthetic transactions. Notification events, for instance, can be configured using an observation API that can be leveraged to communicate synthetic transaction attributes that are observed to various entities. For example, the observation API can identify dialogue events and session events for which attributes of a synthetic transaction can be identified.

Consider, for instance, the following events and attributes that may be conveyed via a notification event:

Dialogue Events—

These events apply to various portions of a synthetic transaction, such as the start, update, and end of a synthetic transaction. A dialogue event can include one or more of the following example attributes.

(1) Timestamp: This attribute can be leveraged to specify timestamps for a start of a synthetic transaction, updates that occur during a synthetic transaction, and an end (e.g., termination) of a synthetic transaction.

(2) Source IP Address: This attribute can be leveraged to specify an IP address for an endpoint that is a source of media during a synthetic transaction, e.g., a device that initiates a synthetic transaction.

(3) Destination IP Address: This attribute can be leveraged to specify an IP address for an endpoint that is to receive media as part of a synthetic transaction.

(4) Transport Type: This attribute can be leveraged to specify a transport type or combination of transport types for a synthetic transaction. Examples of transport types include Transmission Control Protocol (TCP), User Datagram Protocol (UDP), and so forth.

(5) Source Port: this attribute can be leveraged to specify an identifier for a port at a source endpoint, e.g., a source device identified by the Source IP Address referenced above.

(6) Destination Port: This attribute can be leveraged to specify an identifier for a port at a destination endpoint, e.g., a destination device identified by the Destination IP Address referenced above.

(7) Media Type: This attribute can be leveraged to specify a media type and/or types that are transmitted and/or are being transmitted as part of a synthetic transaction. As discussed elsewhere herein, a synthetic transaction can involve multiple different types of media. Thus, the Media Type attribute can be employed to identify media types that are exchanged as part of a synthetic transaction.

(8) Bandwidth Estimation: This attribute can be leveraged to specify an estimated bandwidth that is observed as part of a synthetic transaction.

(9) To: This attribute can be leveraged to identify a user to which media in a synthetic transaction is transmitted.

(10) From: This attribute can be leveraged to identify a user from which media synthetic transaction is transmitted.

(11) Error Code: This attribute can be leveraged to specify various error codes for errors that may occur as part of a synthetic transaction. For example, errors can include errors that occur during initiation of a synthetic transaction, errors that occur during a synthetic transaction, errors that occur when a synthetic transaction is terminated, and so forth.

Transaction Performance Events—

These events can be generated and applied to specify various behaviors and performance parameters that are observed as part of a synthetic transaction. A transaction performance event may include one or more of the attributes discussed above with reference to Dialogue Events, and may also include one or more of the following attributes.

(1) Mean Opinion Score (MOS) Degradation: This attribute can be leveraged to specify a MOS for a synthetic transaction. The attribute, for instance, can be used to indicate an overall quality metric for a synthetic transaction.

(2) Jitter Inter-Arrival Time: This attribute can be leveraged to specify jitter values observed for a synthetic transaction.

(3) Packet Loss Rate: This attribute can be leveraged to specify a packet loss rate observed for a synthetic transaction.

(4) Round Trip Delay (RTD): This attribute can be leveraged to specify RTD values observed for packets in synthetic transaction.

(5) Concealment Ratio: This attribute can be leveraged to indicate an observed cumulative ratio of concealment time over speech time observed for a synthetic transaction.

Thus, various notifications discussed herein can include one or more of the attributes discussed above and can be used to propagate the attributes to various entities. This list of attributes is not exhaustive, and it is to be appreciated that a wide variety of other attributes may be communicated in accordance with the claimed embodiments.

Having described an example ways of defining parameters and communicating observed behaviors of synthetic transactions, consider now some example implementation scenarios for synthetic transaction for wireless handover in accordance with one or more embodiments.

Example Implementation Scenarios

The following section describes example implementation scenarios for synthetic transaction for wireless handover in accordance with one or more embodiments. The implementation scenarios may be implemented in the environment 100 discussed above, and/or any other suitable environment.

Figure 2:
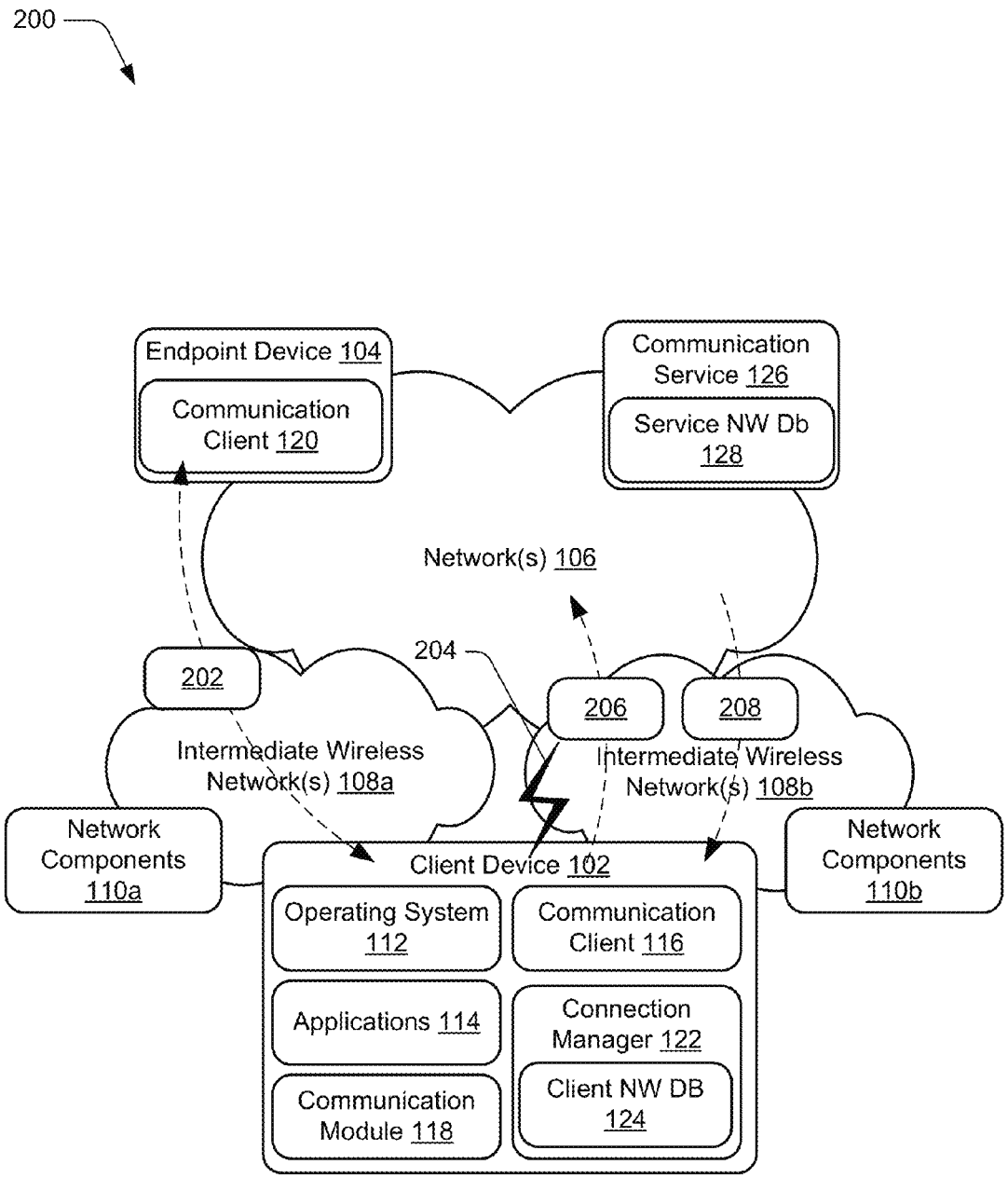
FIG. 2 illustrates an example implementation scenario for determining whether to perform a handover in accordance with one or more embodiments.

FIG. 2 illustrates an example implementation scenario 200 for determining whether to perform a handover in accordance with one or more implementations. In the scenario 200, the client device 102 is engaged in a communication session 202 with the endpoint device 104. The communication session 202, for instance, represents an exchange of communication media between the communication clients 116, 120. Examples of the communication session 202 include a VoIP call, a video call, a UC session, and/or combinations thereof.

Further to the scenario 200, the communication session 202 is communicated to the endpoint device 104 via a wireless connection between the client device 102 and the wireless network 108a. For instance, the communication session 202 is initiated while the client device 102 is connected to the wireless network 108a. For purposes of the scenario 200, consider that the wireless network 108a is a wireless cellular network, such as an LTE network.

While the client device 102 is engaged in the communication session 202 over the wireless network 108a, the client device 102 detects the wireless network 108b. For instance, consider that the client device 102 is a mobile phone and a user of the mobile phone is in motion, e.g., walking, driving, on public transit, and so forth. Accordingly, the client device 102 arrives at a location where the wireless network 108b is detected. The communication module 118, for example, detects wireless signal transmitted by the wireless network 108b, such as a beacon frame transmitted by a wireless access point (AP) of the network components 110b. For purposes of the scenario 200, consider that the wireless network 108b is a wireless broadband network, such as a WiFi™ network.

In response to detecting the wireless network 108b, the connection manager 122 ascertains that a handover (e.g., handoff) procedure can be performed to switch the communication session 202 from the wireless network 108a to the wireless network 108b. However, prior to initiating a handover, the connection manager 122 establishes a virtual connection 204 with the intermediate network 108b. Generally, establishing the virtual connection 204 involves authenticating the client device 102 with the intermediate network 108b to establish a wireless data connection for transmitting data from the client device 102 over the wireless network 108b. Accordingly, the virtual connection 204 enables the client device 102 to transmit and receive ("communicate") data wirelessly over the wireless network 108b while the communication session 202 is in progress over the wireless network 108a.

After the virtual connection 204 is established, the connection manager 122 initiates a synthetic transaction 206 over the virtual connection 204. Generally, the synthetic transaction 206 represents a real-time communication of media data over the wireless network 108b via the virtual connection 204 and while the communication session 202 is in progress. Media data, for instance, represents various types of communication media, such as voice data, video data, and so forth. Media data transmitted as part of the synthetic transaction can take various forms, such as simulated media data, actual media data (e.g., pre-sampled media data), and so forth. In at least some implementations, the synthetic transaction 206 simulates a communication session, such as a VoIP call, a video call, and so forth.

The synthetic transaction 206 may be implemented in various ways, such as between the connection manager 122 and the network components 110b (e.g., one or more APs), between the communication client 116 and one or more of the communication service 126 or the communication client 120, and so forth.

As part of the synthetic transaction 206, the client device 102 streams media data across the wireless network 108b. In response to the synthetic transaction 206, the client device 102 receives a transaction performance event 208 from one or more entities involved in the transaction, such as one or more of the network components 110b, the communication service 126, or the communication client 120. Generally, the performance event 208 includes attributes and behaviors observed at various points and locations during the communication session. In at least some implementations, the performance event 208 is generated using the observation API detailed above. For instance, the performance event 208 includes values for one or more of the attributes described with reference to the observation API. Examples of such attributes include performance attributes observed as part of the synthetic transaction 206, such as jitter, packet loss, packet errors (e.g., packet error rate), round trip delay, and so forth, observed for data of the synthetic transaction 206.

Accordingly, the connection manager 122 processes the performance event 208 to determine a relative signal quality observed for the synthetic transaction 206. For instance, the connection manager 122 compares signal quality indicated by the performance event 208 with a quality threshold. A quality threshold may be specified in various ways, such as an error threshold based on one or more of jitter, packet loss, packet errors, round trip delay, and so forth. In such an implementation, if the performance event 208 indicates that the error threshold is exceeded, the connection manager 122 ascertains that signal quality for the synthetic transaction 206 across the intermediate network 108b is insufficient for performing a handover of the communication session 202 to the intermediate network 108b.

Alternatively or additionally, signal quality indicated by the performance event 208 is compared to a signal quality observed for the intermediate network 108a. Generally, the signal quality may be compared based on various attributes, such as bandwidth observed across the respective wireless networks 108a, 108b, user feedback regarding signal quality, errors observed across the respective wireless networks, and so forth. Accordingly, if the wireless network 108b is indicated as having a higher signal quality than the wireless network 108a, the wireless network 108b may qualify for a handover of the communication session 202. Otherwise, if the signal quality of the wireless network 108*b* is less than that of the wireless network 108*a*, the wireless network 108*b* may be considered to have insufficient quality for a handover of the communication session 202.

Thus, based on signal quality of the wireless network 108*b*, the connection manager 122 determines whether to perform a handover of the communication session to the wireless network 108*b*. For instance, if the wireless network 108*b* meets a threshold signal quality, the connection manager 122 initiates a handover process. However, if the wireless network does not meet a threshold signal quality, a handover is not performed and the communication session 202 is maintained across the wireless network 108*a*.

While the scenario 200 is discussed with reference to a synthetic transaction initiated by the client device 102, it is to be appreciated that techniques discussed herein may be employed to initiate and perform synthetic transactions between a variety of different devices and/or services.

For purposes of example, the scenario 200 is discussed with reference to a single synthetic transaction over a particular network. It is to be appreciated, however, that techniques for synthetic transaction for wireless handover described herein may be employed to perform multiple synthetic transactions over multiple different networks. Consider, for example, that multiple other wireless networks are available besides the wireless network 108*b* for rerouting the communication session from the wireless network 108*a*. Accordingly, different synthetic transactions can be performed over each of the available wireless networks, and performance events can be collected from each of the synthetic transactions. The performance events can then be processed to identify which (if any) of the wireless networks have sufficient signal quality to qualify for a handover of the communication session 202. Further, of those that have sufficient signal quality, a wireless network indicated as having a highest signal quality can be selected for a handover. Thus, multiple available wireless networks can be ranked and sorted based on their respective signal quality, and a wireless network with a highest signal quality can be selected for a handover.

Figure 3:
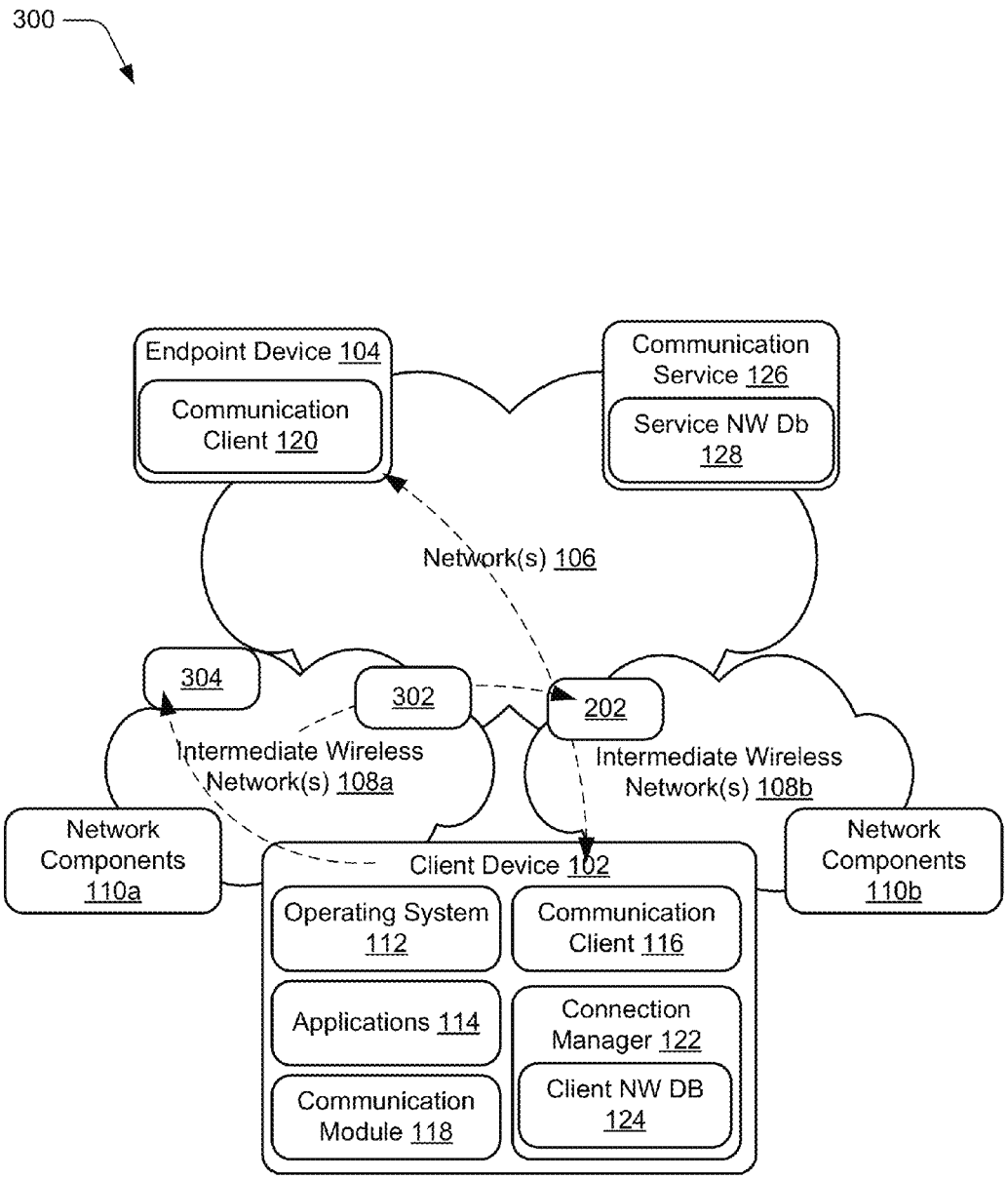
FIG. 3 illustrates an example implementation scenario for performing a handover of a communication session in accordance with one or more embodiments.

FIG. 3 illustrates an example implementation scenario 300 for performing a handover of a communication session in accordance with one or more implementations. The scenario 300, for instance, represents a continuation of the scenario 200 described above.

In the scenario 300, the client device 102 is engaged in the communication session 202 with the endpoint device 104 over the wireless network 108*a*. Further, the synthetic transaction 206 has been performed and the connection manager 122 has received and processed the performance event 208. Based on signal quality for the wireless network 108*b* ascertained from the performance event 208, the connection manager 122 decides to perform a handover of the communication session 202 to the wireless network 108*b*. For instance, the signal quality of the wireless network 108*b* is determined to meet a threshold signal quality for a handover.

Accordingly, the connection manager 122 causes a handover process 302 to be performed such that the communication session 202 is switched from the wireless network 108*a* to being routed over the wireless network 108*b* between the client device 102 and the endpoint device 104. As referenced above, the wireless network 108*a* may represent a wireless cellular network, and the wireless network 108*b* may represent a wireless LAN, e.g., a WiFi™ network. Thus, the handover process 302 may be implemented as a wireless cellular-wireless LAN handover.

Further to the scenario 300, a wireless connection 304 is maintained over the wireless network 108*a* after the handover process 302 is completed and the communication session 202 is rerouted over the wireless network 108*b*. For instance, a wireless cellular network (e.g., LTE) interface connection to the wireless network 108*b* is kept open for a brief period of time (a "handover delay") after the handover process 302 is complete, such as 1 second, 5 seconds, and so forth. In at least some implementations, maintaining the wireless connection 304 enables the communication session 202 to be rerouted from the wireless network 108*b* back to the wireless network 108*a*. For instance, if during or shortly after the handover process 302 is completed a problem with the connection to the wireless network 108*b* is detected, a further handover process back to the wireless network 108*a* can be performed. Thus, implementations discussed herein provide for a reversible handover process to be employed should a problem be detected with a wireless network involved in a handover procedure. In at least some implementations, once the handover delay period expires, the wireless connection 304 is terminated. For instance, a wireless cellular network interface connection to the wireless network 108*a* is closed after the handover delay expires.

According to one or more implementations, the communication service 126 and/or the connection manager 122 ascertains a session quality for the communication session 202 over the wireless network 108*b*. For instance, one or more of the communication clients 116, 120 detects a signal quality experienced as part of the communication session 202, such as based packet errors, jitter, packet delay, and so forth. Thus, indicators of the signal quality can be communicated to the communication service 126 and/or the client device 102, such as using the observation API described above. If the signal quality indicates that the communication session 202 meets a threshold signal quality, the service network DB 128 and/or the client network DB 124 are updated to indicate that the wireless network 108*b* is a trusted wireless network. For instance, an entry is created in the network DB that identifies the wireless network 108*b* and that specifies that the wireless network 108*b* is trusted based on past performance to provide an acceptable level of quality for wireless communication of data. The service network DB 128 and the client network DB 124 are dynamically updateable to reflect changes in signal quality across different wireless networks.

While the scenario 300 is discussed with reference to the handover process 302 being performed in response to detecting that the wireless network 108*b* meets a quality threshold for initiating the handover, at least some implementations provide for a user override should the wireless network 108*b* not meet the quality threshold. For instance, consider the following implementation scenario.

Figure 4:
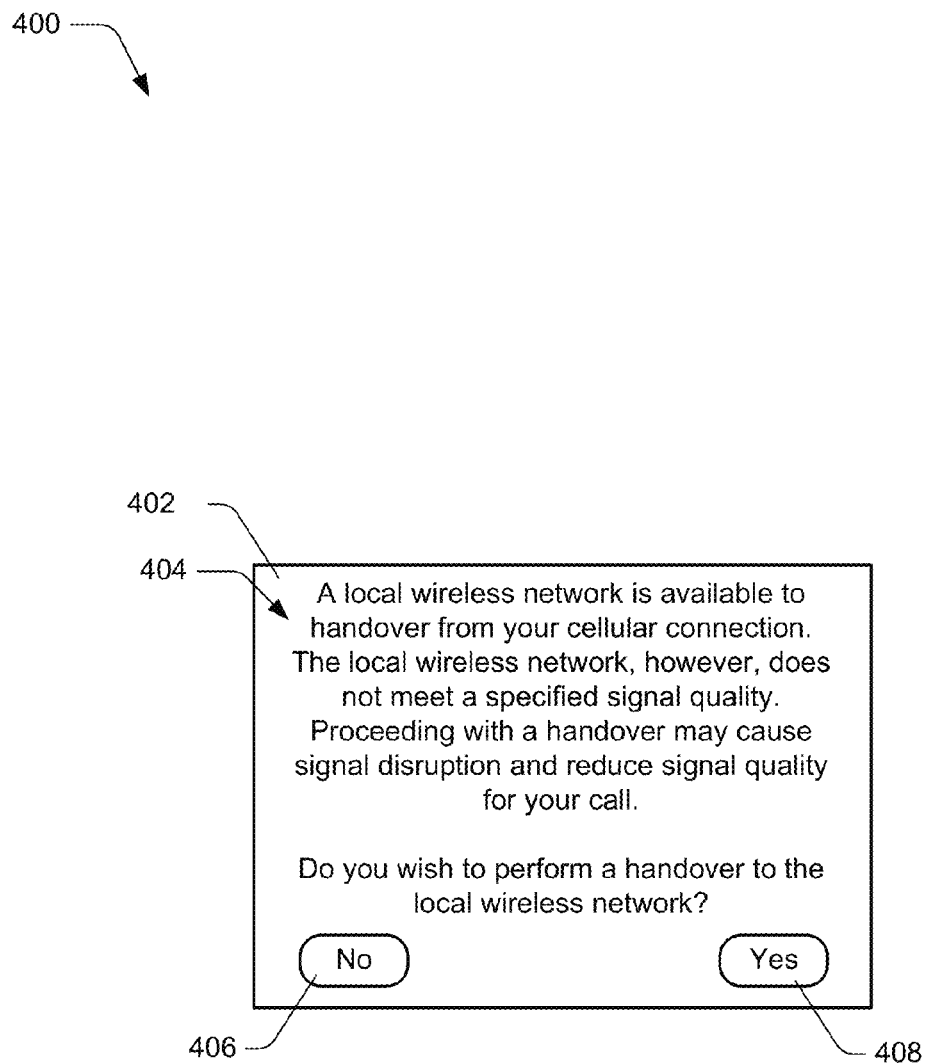
FIG. 4 illustrates an example implementation scenario for overriding a default handover behavior in accordance with one or more embodiments.

FIG. 4 illustrates an example implementation scenario 400 for overriding a default handover behavior in accordance with one or more implementations. Generally, the scenario 400 represents a variation on the scenarios described above, and may be implemented in the environment 100 described above.

The scenario 400 includes a handover graphical user interface (GUI) 402, which is displayed on the client device 102 in response to ascertaining that a signal quality across the wireless network 108*b* does not meet (is below) a threshold signal quality. For instance, performance attributes indicated in the performance event 208 indicate that signal quality across the wireless network 108*b* is below a threshold signal quality. Accordingly, the handover GUI 402 is presented on the client device 102 and while the communication session 202 is in progress.

The handover GUI 402 includes a network notification 404 that includes information (e.g., text) capable of informing a user that a local wireless network (e.g., WiFi™) is available for a handover from wireless cellular. The network notification 404 further specifies that a signal quality for the local wireless network does not meet a threshold signal quality, and prompts the user as to whether the client device 102 should be perform a handover to the local wireless network regardless. The GUI 402 further includes a selectable control 406 that is selectable by a user to maintain the current connection to the wireless cellular network such that a handover to the local wireless network is not performed. For instance, with reference to the scenarios described above, user selection of the selectable control 406 maintains the connection over the wireless network 108a for the communication session 202.

The GUI 402 further includes a selectable control 408 that is selectable by a user to cause a handover to the local wireless network. With reference to the scenarios described above, for example, user selection of the selectable control 408 causes a handover process to the wireless network 108b to be initiated. Thus, implementations provide a user with an option to override a default behavior that would prevent a handover to a wireless network that does not meet a threshold signal quality. For instance, where a currently-connected network is a metered network that charges based on usage, a user may be willing to trade decreased signal quality for cheaper (e.g., free) wireless connectivity that may be provided by the local wireless network.

Having discussed some example implementation scenarios, consider now a discussion of some example procedures in accordance with one or more embodiments.

Example Procedures

The following discussion describes some example procedures for synthetic transaction for wireless handover in accordance with one or more embodiments. The example procedures may be employed in the environment 100 of FIG. 1, the system 900 of FIG. 9, and/or any other suitable environment. The procedures, for instance, represent procedures for implementing the example implementation scenarios discussed above. In at least some embodiments, the steps described for the various procedures can be implemented automatically and independent of user interaction.

Figure 5:
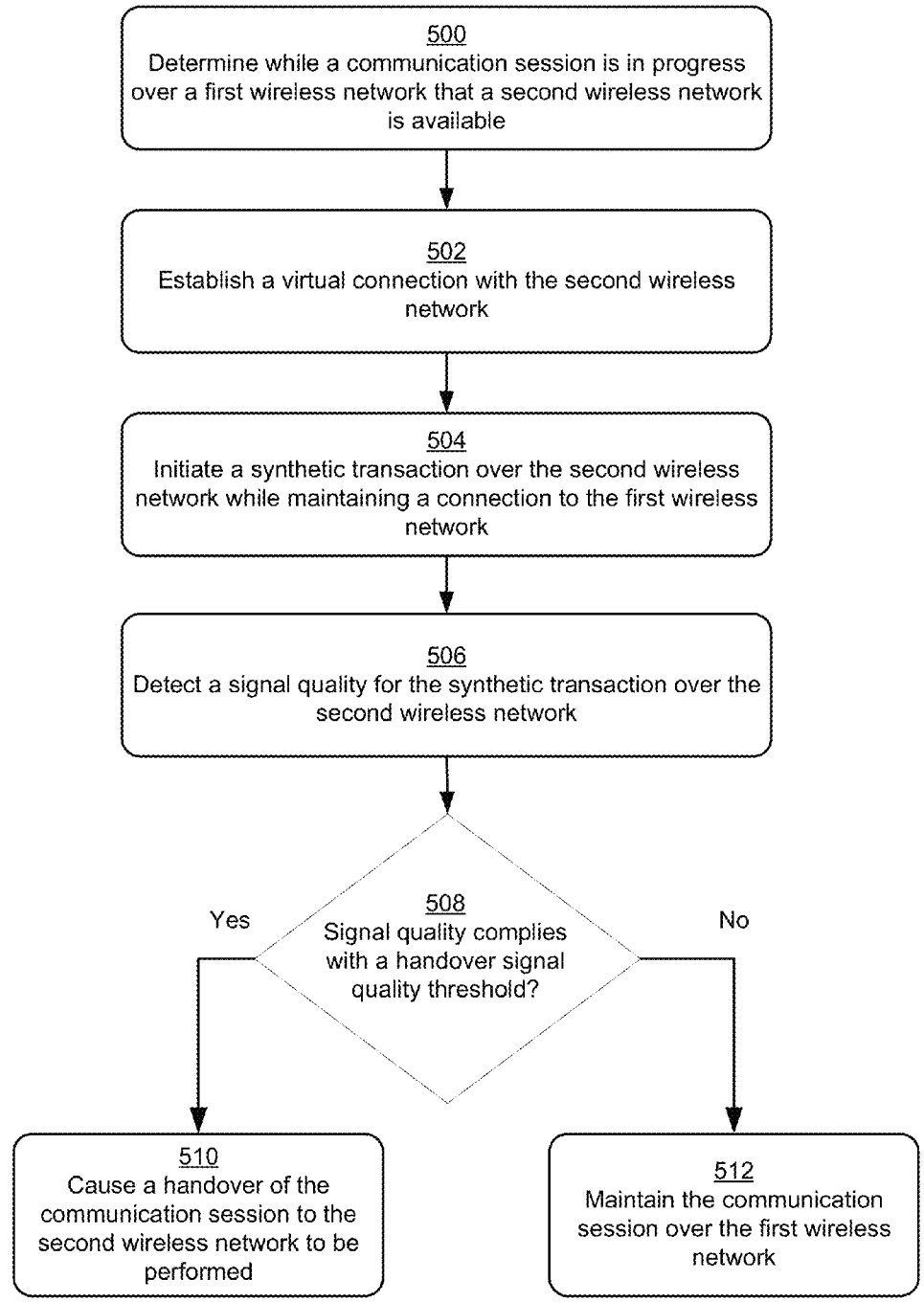
FIG. 5 is a flow diagram that describes steps in a method for initiating a synthetic transaction in accordance with one or more embodiments.

FIG. 5 is a flow diagram that describes steps in a method in accordance with one or more embodiments. The method describes an example procedure for initiating a synthetic transaction in accordance with one or more embodiments.

Step 500 determines while a communication session is in progress over a first wireless network that a second wireless network is available. The client device 102, for example, detects that the wireless network 108b is available while the communication session 202 is in progress over the wireless network 108a.

Step 502 establishes a virtual connection with the second wireless network. The client device 102, for instance, engages in an authentication process with the wireless network 108b to establish the virtual connection with the wireless network 108b. Generally, the virtual connection represents an authenticated data path that enables data flow over the second wireless network while the communication session is in progress over the first wireless network.

Step 504 initiates a synthetic transaction over the second wireless network while maintaining a connection to the first wireless network. For instance, the client device 102 and/or the communication service 126 initiates the synthetic transaction 206 via the virtual connection over the wireless network 108b while the communication session is in progress over the wireless network 108a. As detailed above, the synthetic transaction 206 includes communication media and/or simulated communication media, such as actual and/or simulated voice data, video data, and so forth. Thus, the synthetic transaction 206 is performed in real-time over the wireless network 108b while the communication session 202 is in progress over the wireless network 108a.

Step 506 detects a signal quality for the synthetic transaction over the second wireless network. The client device 102, for example, receives a notification (e.g., the performance event 208) that identifies various quality-related attributes for the communication session 202 from one or more entities involved in the communication session. Alternatively or additionally, the client device 102 directly detects quality attributes for the communication session 202, such as based on a signal quality for the communication session 202 on a return path to the client device 102.

Step 508 ascertains whether the signal quality complies with a handover signal quality threshold. Generally, the handover signal quality threshold specifies a threshold signal quality for performing a handover of the communication session to the second wireless network. The signal quality threshold may be specified in various ways. For instance, the threshold may be specified in terms of a number of errors detected in media flow for a communication session. The threshold, for example, may be defined in terms a maximum number of errors such that exceeding the maximum number of errors indicates a failure to comply with the signal quality threshold. Various types of errors may be used to define a signal quality threshold, examples of which are detailed above.

Alternatively or additionally, the handover signal quality threshold may be specified in terms of a comparison with signal quality of a different wireless network, such as the wireless network over which the communication session is currently routed. For instance, signal quality for different networks can be characterized in various ways, such as a number of errors observed over data flows over the respective networks, user feedback regarding signal quality over the respective networks, and so forth. Thus, if signal quality for a candidate wireless network being considered for a handover of a communication session is less than a signal quality for a current wireless network for the communication session, the candidate wireless network fails to comply with the handover signal quality threshold.

These particular signal quality thresholds are provided for purpose of example only, and signal quality threshold may be defined in a variety of different ways in accordance with the claimed implementations.

If the signal quality complies with the signal quality threshold ("Yes"), step 510 causes a handover of the communication session to the second wireless network to be performed. The connection manager 122, for example, initiates a handover procedure for the communication session 202 from the wireless network 108a to the wireless network 108b. Accordingly, the handover is performed such that the communication session 202 is rerouted to the wireless network 108b.

If the signal quality does not comply with the signal quality threshold ("No"), step 512 maintains the communication session over the first wireless network. For instance, a handover procedure is not performed and the communication session continues to be routed over the first wireless network.

According to various implementations, the procedure described above can be continuously and/or periodically performed to identify networks that are available for a handover of a communication session. For instance, after a handover is performed to a wireless network, other wireless networks may be detected that are candidates for a further handover procedure. Thus, the procedure may be performed to optimize communication session performance by detecting and testing available wireless networks to identify a wireless network that can provide the highest quality signal flow for the communication session.

Figure 6:
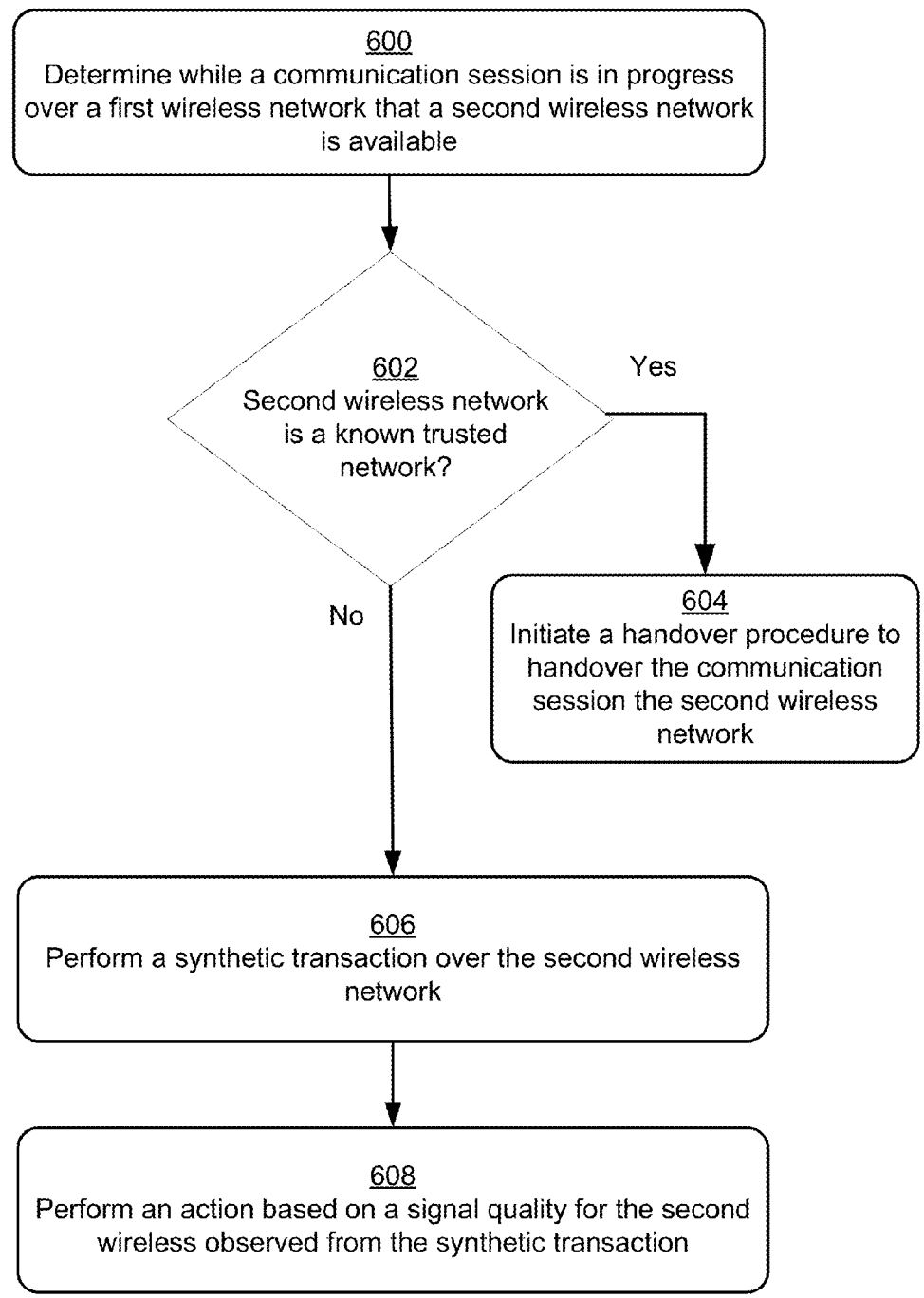
FIG. 6 is a flow diagram that describes steps in a method for ascertaining whether to initiate a synthetic transaction in accordance with one or more embodiments.

FIG. 6 is a flow diagram that describes steps in a method in accordance with one or more embodiments. The method describes an example procedure for ascertaining whether to initiate a synthetic transaction in accordance with one or more embodiments. In at least some implementations, the procedure describes a variation and/or extension of the procedure described above with reference to FIG. 5.

Step 600 determines while a communication session is in progress over a first wireless network that a second wireless network is available. The client device 102, for instance, detects that the wireless network 108b is available while the communication session 202 is in progress over the wireless network 108a.

Step 602 ascertains whether the second wireless network is a known trusted network. The second wireless network, for instance, is compared to a list of known trusted wireless networks. For instance, one or more of the client network DB 124 or the service network DB 128 includes a list of known trusted wireless networks. Thus, the client network DB 124 and/or the service network DB 128 are searched to see if the second wireless network is identified as a known trusted wireless network. Generally, a known trusted wireless network represents a network that is known to provide a threshold quality of wireless signal connectivity, such as based on past performance observed for the network.

In some implementations, a list of known trusted wireless networks can be arranged as a ranked list with trusted wireless networks being listed in descending order of preference, e.g., with a most preferred wireless network ranked highest. Thus, available wireless networks at a particular location can be sorted to select a highest ranked known trusted network to receive a handover of a communication session.

If the second wireless network is ascertained to be a known trusted network ("Yes"), step 604 initiates a handover procedure to handover the communication session the second wireless network. Example ways of initiating a handover procedure are described above.

If the second wireless network is not ascertained to be a known trusted network ("No"), step 606 performs a synthetic transaction over the second wireless network. As detailed above, the synthetic transaction is leveraged to detect whether the second wireless network meets a threshold signal quality for performing a handover of the communication session to the second wireless network.

Step 608 performs an action based on a signal quality for the second wireless observed from the synthetic transaction. Examples of different actions are detailed above.

Figure 7:
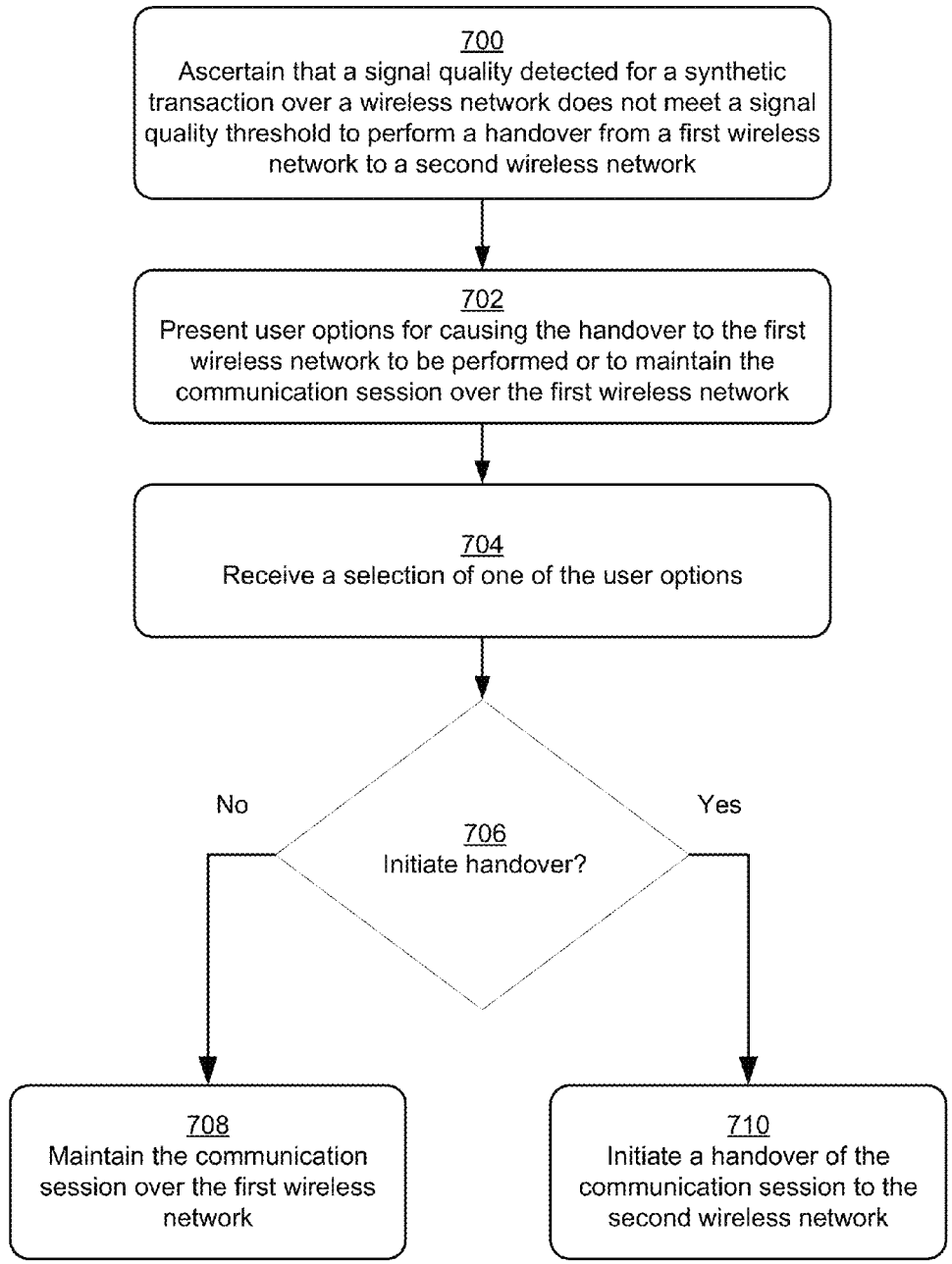
FIG. 7 is a flow diagram that describes steps in a method for providing a user option to override a default behavior for low signal quality in accordance with one or more embodiments.

FIG. 7 is a flow diagram that describes steps in a method in accordance with one or more embodiments. The method describes an example procedure for providing a user option to override a default behavior for low signal quality in accordance with one or more embodiments. In at least some implementations, the procedure describes a variation and/or extension of the procedures described above, such as a variation and/or detailed implementation of step 512 described with reference to FIG. 5.

Step 700 ascertains that a signal quality detected for a synthetic transaction over a wireless network does not meet a signal quality threshold to perform a handover from a first wireless network to a second wireless network. Examples ways of evaluating a signal quality for a synthetic transaction based on a signal quality threshold are described above.

Step 702 presents user options for causing the handover to the first wireless network to be performed or to maintain the communication session over the first wireless network. The connection manager 122, for instance, presents the GUI 402 that includes a first selectable option that is selectable to cause the handover to the second wireless network to be performed, and a second selectable option that is selectable to maintain the communication session over the first wireless network.

Step 704 receives a selection of one of the user options. With reference to the GUI 402, for instance, the connection manager 122 ascertains that one of the selectable controls 406, 408 is selected.

Step 706 ascertains whether to initiate the handover of the communication session based on which of the user options is selected. If the user option to maintain the communication session over the first wireless network is selected ("No Handover"), step 708 maintains the communication session over the first wireless network. For instance, in response to user selection of the selectable control 406 a handover to the second wireless network is not performed.

If the user option to perform the handover is selected ("Perform Handover"), step 710 initiates a handover of the communication session to the second wireless network. For instance, in response to user selection of the selectable control 408 a handover to the second wireless network is performed. In at least some implementations, this overrides a default behavior of not performing a handover if signal quality is below a threshold signal quality.

Figure 8:
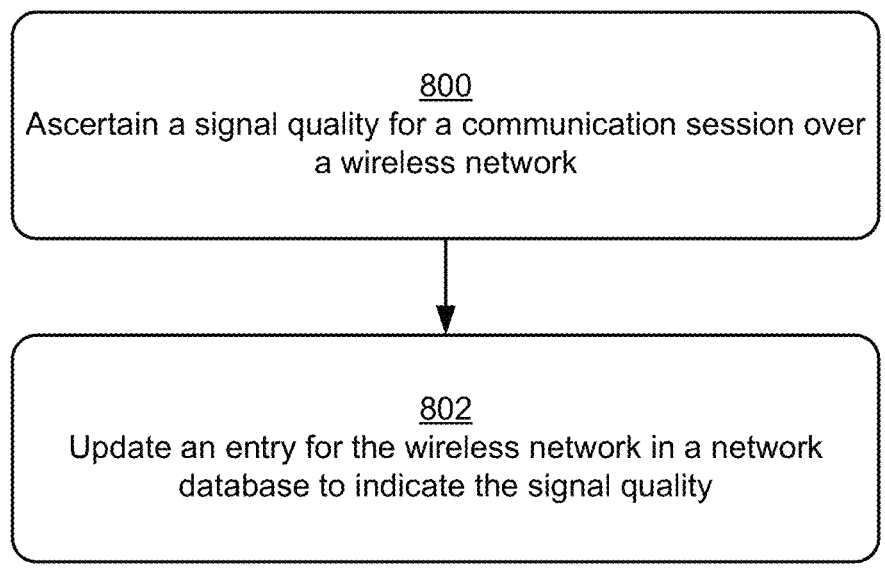
FIG. 8 is a flow diagram that describes steps in a method for updating an entry for a wireless network in a network database in accordance with one or more embodiments.

FIG. 8 is a flow diagram that describes steps in a method in accordance with one or more embodiments. The method describes an example procedure for updating an entry for a wireless network in a network database in accordance with one or more embodiments. In at least some implementations, the procedure describes a variation and/or extension of the procedures described above.

Step 800 ascertains a signal quality for a communication session over a wireless network. The wireless network, for instance, represents a wireless network that receives a handover of the communication session from another wireless network. The signal quality may be ascertained in various ways, such as based on signal detected by devices involved in the communication session, based on user feedback regarding a session quality for the communication session, and so forth.

Step 802 updates an entry for the wireless network in a network database to indicate the signal quality. The entry, for instance, is updated to indicate a relative quality level for the wireless network, such as whether the wireless network is a high quality network, medium quality network, low quality network, and so forth. If the wireless network is found to comply with a threshold signal quality (discussed above), the wireless network may be tagged as a known trusted wireless network. As discussed above, known trusted wireless networks may be used for automatic handovers and without requiring that a synthetic transaction be performed to ascertain a quality of the network. In at least some implementations, the entry for the wireless network represents an entry in the client network DB 124 and/or the service network DB 128.

Having discussed some example procedures, consider now a discussion of an example system and device in accordance with one or more embodiments.

Example System and Device

Figure 9:
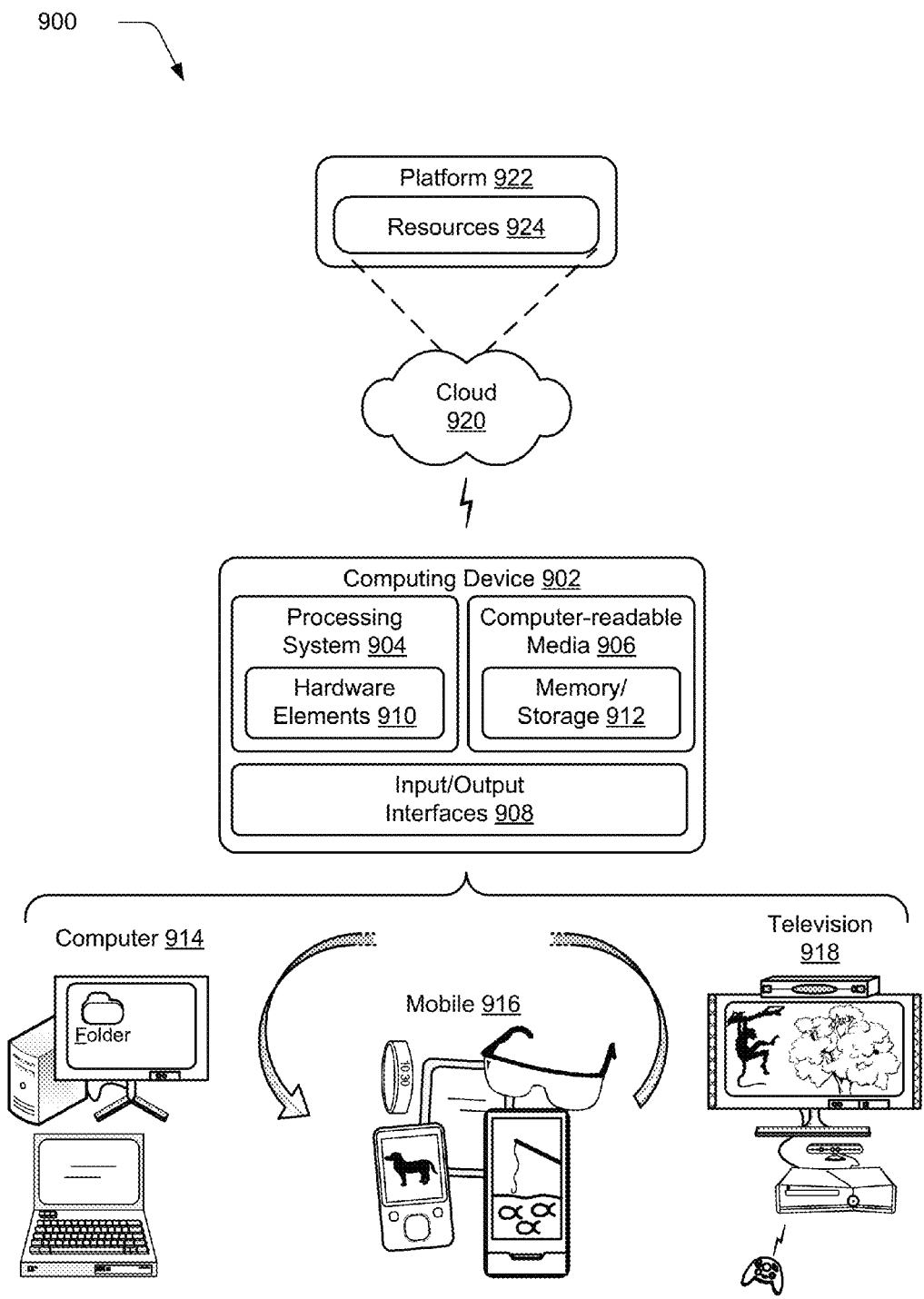
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, the client device 102 and/or the endpoint device 104 discussed above with reference to FIG. 1 can be embodied as the computing device 902. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more Input/Output (I/O) Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules that are executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, wearable devices, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. For example, functionalities discussed with reference to the entities of the environment 100 may be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A system for causing a handover of a communication session, the system including: at least one processor; and one or more computer-readable storage media including instructions stored thereon that, responsive to execution by the at least one processor, cause the system perform operations including: determining while a communication session is in progress over a first wireless network that a second wireless network is available; initiating a synthetic transaction over the second wireless network while maintaining a connection to the first wireless network; ascertaining based on a signal quality detected for the synthetic transaction that the second wireless network complies with a signal quality threshold for allowing a handover of the communication session to the second wireless network; and causing the handover of the communication session to the second wireless network to be performed.

Example 2

A system as described in example 1, wherein the first wireless network includes a wireless cellular network, and wherein the second wireless network includes a local area network.

Example 3

A system as described in one or more of examples 1 or 2, wherein the synthetic transaction includes an exchange of communication media over the second wireless network while the communication session is in progress over the first wireless network.

Example 4

A system as described in one or more of examples 1-3, wherein the synthetic transaction simulates an exchange of communication media over the second wireless network.

Example 5

A system as described in one or more of examples 1-4, wherein the synthetic transaction simulates at least a portion of a real-time communication session.

Example 6

A system as described in one or more of examples 1-5, wherein the synthetic transaction is performed with a remote entity, and wherein an indication of the signal quality for the synthetic transaction is received from the remote entity.

Example 7

A system as described in one or more of examples 1-6, wherein the signal quality threshold is based on a threshold number of errors detected in a signal flow, and wherein said ascertaining includes ascertaining that the signal quality for the synthetic transaction does not exceed the threshold number of errors.

Example 8

A system as described in one or more of examples 1-7, wherein the signal quality threshold is based on a signal quality detected for the communication session across the first wireless network, and wherein said ascertaining includes ascertaining that the signal quality for the synthetic transaction at least meets the signal quality of the communication session across the first wireless network.

Example 9

A system as described in one or more of examples 1-8, wherein the operations further include, prior to initiating the synthetic transaction, establishing a virtual connection to the second wireless network while the communication session is in progress over the first wireless network.

Example 10

A system as described in one or more of examples 1-9, wherein the operations further include, prior to initiating the synthetic transaction, ascertaining whether the second wireless network is a known trusted network, and wherein said initiating the synthetic transaction is performed responsive to ascertaining that the second wireless network is not a known trusted network.

Example 11

A system as described in one or more of examples 1-10, wherein the operations further include, after the handover of the communication session to the second wireless network: detecting that one or more additional wireless networks are available while the communication session is in progress over the second wireless network; initiating one or more synthetic transactions over the one or more additional wireless networks and while the communication session is in progress over the second wireless network; and ascertaining whether to perform a handover to a particular wireless network of the one or more additional wireless networks based on a signal quality detected for the one or more synthetic transactions.

Example 12

A system as described in one or more of examples 1-11, wherein the operations further include maintaining a connection to the first wireless network for period of time after the handover of the communication session to the second wireless network.

Example 13

A system as described in one or more of examples 1-12, wherein the operations further include, after the handover of the communication session to the second wireless network: ascertaining a signal quality for the communication session over the second wireless network; and updating an entry for the second wireless network in a network database to indicate the signal quality for the communication session over the second wireless network.

Example 14

A computer-implemented method for ascertaining whether to perform a handover of a communication session, the method including: determining while a communication session is in progress over a first wireless network that a second wireless network is available; initiating a synthetic transaction over the second wireless network while maintaining a connection to the first wireless network; and ascertaining whether to perform a handover of the communication session to the second wireless network based on a signal quality detected for the synthetic transaction.

Example 15

A method as described in example 14, wherein said initiating includes initiating the synthetic transaction over the second wireless network while the communication session is in progress over the first wireless network.

Example 16

A method as described in one or more of examples 14 or 15, wherein said ascertaining includes ascertaining that the signal quality detected for the synthetic transaction does not meet a signal quality threshold to perform the handover, and wherein the method further includes maintaining the communication session over the first wireless network.

Example 17

A method as described in one or more of examples 14-16, wherein said ascertaining includes ascertaining that the signal quality detected for the synthetic transaction does not meet a signal quality threshold to perform the handover, and wherein the method further includes: presenting a graphical user interface (GUI) that includes a first selectable option that is selectable to cause the handover to the second wireless network to be performed, and a second selectable option that is selectable to maintain the communication session over the first wireless network; and ascertaining whether to initiate the handover of the communication session to the second wireless network based on which of the first selectable option or the second selectable option is selected.

Example 18

A computer-implemented method for ascertaining whether to perform a synthetic transaction to determine a quality of a wireless network, the method including: determining while a communication session is in progress over a first wireless network that a second wireless network is available; ascertaining whether the second wireless network is a known trusted network; in an event that the second wireless network is ascertained to be a known trusted network, initiating a handover procedure to handover the communication session the second wireless network; and in an event that the second wireless network is not ascertained to be a known trusted network, performing a synthetic transaction for detecting whether the second wireless network meets a threshold signal quality for performing a handover of the communication session to the second wireless network.

Example 19

A method as described in example 18, wherein in an event that the second wireless network is ascertained to be a known trusted network, said initiating is performed without performing a synthetic transaction over the second wireless network.

Example 20

A method as described in one or more of examples 18 or 19, wherein said ascertaining includes comparing the second wireless network to a ranked list of known trusted wireless networks, and wherein the method further includes determining that the second wireless network is a highest ranked known trusted wireless network that is available for the handover of the communication session.

CONCLUSION

Techniques for synthetic transaction for wireless handover are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:
1. A system comprising:
at least one processor; and
one or more computer-readable storage media including instructions stored thereon that, responsive to execution by the at least one processor, cause the system perform operations including:
determining while a communication session is in progress over a first wireless network that a second wireless network is available;
ascertaining whether the second wireless network is a known trusted network;
responsive to ascertaining that the second wireless network is not a known trusted network, initiating a synthetic transaction over the second wireless network while maintaining a connection to the first wireless network;
ascertaining based on a signal quality detected for the synthetic transaction that the second wireless network complies with a signal quality threshold for allowing a handover of the communication session to the second wireless network; and
causing the handover of the communication session to the second wireless network to be performed.

2. The system as recited in claim 1, wherein the first wireless network comprises a wireless cellular network, and wherein the second wireless network comprises a local area network.

3. The system as recited in claim 1, wherein the synthetic transaction comprises an exchange of communication media over the second wireless network while the communication session is in progress over the first wireless network.

4. The system as recited in claim 1, wherein the synthetic transaction simulates an exchange of communication media over the second wireless network.

5. The system as recited in claim 1, wherein the synthetic transaction simulates at least a portion of a real-time communication session.

6. The system as recited in claim 1, wherein the synthetic transaction is performed with a remote entity, and wherein an indication of the signal quality for the synthetic transaction is received from the remote entity.

7. The system as recited in claim 1, wherein the signal quality threshold is based on a threshold number of errors detected in a signal flow, and wherein said ascertaining comprises ascertaining that the signal quality for the synthetic transaction does not exceed the threshold number of errors.

8. The system as recited in claim 1, wherein the signal quality threshold is based on a signal quality detected for the communication session across the first wireless network, and wherein said ascertaining comprises ascertaining that the signal quality for the synthetic transaction at least meets the signal quality of the communication session across the first wireless network.

9. The system as recited in claim 1, wherein the operations further include, prior to initiating the synthetic transaction, establishing a virtual connection to the second wireless network while the communication session is in progress over the first wireless network.

10. The system as recited in claim 1, wherein the operations further include, after the handover of the communication session to the second wireless network:
- detecting that one or more additional wireless networks are available while the communication session is in progress over the second wireless network;
- initiating one or more synthetic transactions over the one or more additional wireless networks and while the communication session is in progress over the second wireless network; and
- ascertaining whether to perform a handover to a particular wireless network of the one or more additional wireless networks based on a signal quality detected for the one or more synthetic transactions.

11. The system as recited in claim 1, wherein the operations further include maintaining a connection to the first wireless network for period of time after the handover of the communication session to the second wireless network.

12. The system as recited in claim 1, wherein the operations further include, after the handover of the communication session to the second wireless network:
- ascertaining a signal quality for the communication session over the second wireless network; and
- updating an entry for the second wireless network in a network database to indicate the signal quality for the communication session over the second wireless network.

13. A computer-implemented method comprising:
- determining while a communication session is in progress over a first wireless network that a second wireless network is available;
- establishing a virtual connection to the second wireless network while the communication session is in progress over the first wireless network;
- initiating a synthetic transaction over the virtual connection to the second wireless network while maintaining a connection to the first wireless network; and
- ascertaining whether to perform a handover of the communication session to the second wireless network based on a signal quality detected for the synthetic transaction.

14. The method as described in claim 13, wherein said initiating comprises initiating the synthetic transaction over the second wireless network while the communication session is in progress over the first wireless network.

15. The method as described in claim 13, wherein said ascertaining comprises ascertaining that the signal quality detected for the synthetic transaction does not meet a signal quality threshold to perform the handover, and wherein the method further comprises maintaining the communication session over the first wireless network.

16. The method as described in claim 13, wherein said ascertaining comprises ascertaining that the signal quality detected for the synthetic transaction does not meet a signal quality threshold to perform the handover, and wherein the method further comprises:
- presenting a graphical user interface (GUI) that includes a first selectable option that is selectable to cause the handover to the second wireless network to be performed, and a second selectable option that is selectable to maintain the communication session over the first wireless network; and
- ascertaining whether to initiate the handover of the communication session to the second wireless network based on which of the first selectable option or the second selectable option is selected.

17. A computer-implemented method comprising:
- determining while a communication session is in progress over a first wireless network that a second wireless network is available;
- ascertaining whether the second wireless network is a known trusted network;
- in an event that the second wireless network is ascertained to be a known trusted network, initiating a handover procedure to handover the communication session the second wireless network; and
- in an event that the second wireless network is not ascertained to be a known trusted network, performing a synthetic transaction for detecting whether the second wireless network meets a threshold signal quality for performing a handover of the communication session to the second wireless network.

18. The method as described in claim 17, wherein in an event that the second wireless network is ascertained to be a known trusted network, said initiating is performed without performing a synthetic transaction over the second wireless network.

19. The method as described in claim 17, wherein said ascertaining comprises comparing the second wireless network to a ranked list of known trusted wireless networks, and wherein the method further comprises determining that the second wireless network is a highest ranked known trusted wireless network that is available for the handover of the communication session.

20. The system as recited in claim 1, wherein the operations further include, causing a database of known trusted networks to be updated to include the second wireless network.

* * * * *